3,042,707
Patented July 3, 1962

3,042,707
PROCESS FOR MAKING ESTERS OF SUBSTITUTED POLYHYDRONAPHTHALENE ACIDS
Robert Joly, Montmorency, and Julien Warnant, Neuilly-sur-Seine, France, assignors, by mesne assignments, to Roussel-Uclaf, S.A., Paris, France, a corporation of France
No Drawing. Filed Apr. 30, 1958, Ser. No. 731,871
Claims priority, application France June 14, 1957
1 Claim. (Cl. 260—468)

The present invention relates to a substituted polyhydronaphthalene carboxylic acid and its lower alkyl esters and, more particularly, to the levorotatory 3β-acetoxy-2α - methoxy - 7 - oxo - 1,2,3,4,4aα7,8,8aα - octahydronaphalene-1β-carboxylic acid and its lower alkyl esters, and to a process of making same.

Said 3β-acetoxy-2α-methoxy-7-oxo-1,2,3,4,4aα,7,8,8aα-octahydronaphthalene-1β-carboxylic acid and its ester correspond to the following Formula I

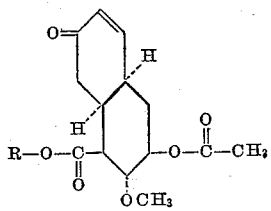

wherein R represents a member selected from the group consisting of hydrogen and a lower alkyl radical.

These compounds are important intermediates in the synthesis of reserpine, deserpidine, rescinnamine, and related compounds.

In commonly assigned application Serial No. 693,028 filed on October 29, 1957, now U.S. Patent No. 2,952,682, a process of producing reserpine is described wherein the dextrorotatory 5β-hydroxy-8-oxo-1,4,4aα,5,8,8aα-hexahydronaphthalene-1β-carboxylic acid is used as starting material and the methyl ester of 3β-acetoxy-2α-methoxy-7-oxo - 1,2,3,4,4aα,7,8,8aα - octahydronaphthalene - 1β - carboxylic acid is an important intermediate. Said methyl ester is prepared by esterification of the levorotatory 3β-hydroxy - 2α - methoxy - 7 - oxo - 1,2,3,4,4aα,7,8,8aα - hydronaphthalene-1β-carboxylic acid by means of diazomethane and acetylation of the resulting methyl ester.

It is one object of the present invention to provide a simple and economical process suitable for large scale production of the levorotatory 3β-acetoxy-2α-methoxy-7-oxo - 1,2,3,4,4aα,7,8,8aα - octahydronaphthalene - 1β - carboxylic acid and its lower alkyl esters of the above given Formula I.

Another object of the present invention is to provide the levorotatory 3β-acetoxy-2α-methoxy-7-oxo-1,2,3,4,4aα,7,8,8aα-octahydronaphthalene-1β-carboxylic acid and its lower alkyl esters.

Other objects of the present invention and advantageous features thereof will become apparent as the description proceeds.

In principle, the present invention consists in producing the lower alkyl esters of 3β-hydroxy-2α-methoxy-7-oxo - 1,2,3,4,4aα,7,8,8,aα - octahydronaphthalene - 1β - carboxylic acid by a process more readily applicable to large scale production which process avoids the use of diazomethane as esterifying agent. Diazomethane is not only an expensive and dangerous reagent but also allows only the production of methyl esters.

According to the process of the present invention the levorotatory 3β-hydroxy-2α-methoxy-7-oxo-1,2,3,4,4aα,7,8,8aα-octahydronaphthalene-1β-carboxylic acid is first acetylated to 3β-acetoxy-2α-methoxy-7-oxo-1,2,3,4,4aα,7,8,8aα-octahydronaphthalene-1β-carboxylic acid. An alkali metal salt of said acid is then prepared and esterified in a homogeneous medium by means of a dialkyl sulfate, such as dimethyl sulfate, diethyl sulfate, dipropyl sulfate, and the like. The homogeneous medium is obtained by using a neutral organic solvent which does not contain hydroxyl groups and which is miscible with water, such as acetone, dioxane or tetrahydrofurane together with water. The alkali metal salt of said acetylated acid may be prepared before or during esterification reaction by the addition of an alkali metal salt which is readily decomposed by 3β-acetoxy-2α-methoxy-7-oxo-1,2,3,4,4aα,7,8,8aα-octahydronaphthalene-1β-carboxylic acid, such as the bicarbonates, the acetates, or the phosphates, in such a manner that the reaction mixture never turns alkaline.

The levorotatory 3β-acetoxy-2α-methoxy-7-oxo-1,2,3,4, 4aα,7,8,8aα - octahydronaphthalene - 1β - carboxylic acid which has not yet been described, is prepared according to the present invention by subjecting the levorotatory 3β - hydroxy - 2α - methoxy - 7 - oxo - 1,2,3,4,4aα,7,8,8aα - octahydronaphthalene-1β-carboxylic acid to the action of acetic acid anhydride in the presence of a tertiary base, for instance, pyridine, methyl ethyl pyridine or triethylamine. It is surprising and it was not to be foreseen that during this reaction no lactonization takes place. According to the present invention, said method of acetylation is carried out most profitably when the zinc salt of 3β-hydroxy-2α-methoxy-7-oxo-1,2,3,4,4aα,7,8,8aα-octahydronaphthalene-1β-carboxylic acid is acetylated, thus avoiding the isolation of the levorotatory 3β-hydroxy-2α-methoxy - 7 - oxo - 1,2,3,4,4aα,7,8,8aα - octahydronaphthalene-1β-carboxylic acid. Said zinc salt is obtained according to the process described in U.S. Patent Number 2,952,682 on reducing the levorotatory lactone of 6α-bromo-8β-hydroxy-2α-methoxy-3β,5β-epoxy-7-oxo-4aα,8aα - decahydronaphthalene - 1β - carboxylic acid by means of zinc in the presence of acetic acid.

The process according to the present invention is illustrated by the following formulas and equations:

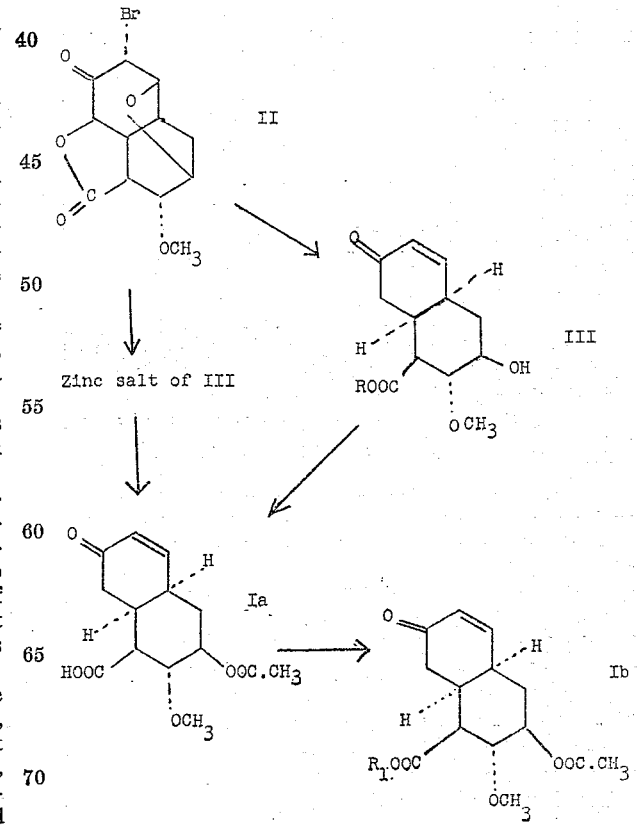

As stated hereinabove, the starting material for carrying out the process according to the present invention, the levorotatory 3β-hydroxy-2α-methoxy-7-oxo-1,2,3,4,4aα,7,8,8aα-octahydronaphthalene-1β-carboxylic acid of Formula III or its zinc salt is obtained by dissolving, for instance, the levorotatory lactone of 6α-bromo-8β-hydroxy-2α - methoxy - 3β,5β - epoxy - 7 - oxo - 4aα,8aα - decahydronaphthalene-1β-carboxylic acid of Formula II in a mixture of acetone and acetic acid, cooling the solution to about +5° C. and adding zinc powder thereto. The mixture is stirred for some time at a temperature of about 15° C., filtered, and the filtrate is evaporated to dryness in a vacuum. The evaporation residue is dissolved in chloroform containing 20% of ethanol, water is added, the solution is acidified with 7 N sulfuric acid to a pH of 1.0, and is extracted by means of chloroform containing 20% of ethanol. The combined chloroform extracts are dried over magnesium sulfate and evaporated to dryness in a vacuum. On recrystallization from a mixture of acetone and ether (2:3), substantially pure levorotatory 3β-hydroxy-2α-methoxy-7-oxo-1,2,3,4,4aα,7,8,8aα-octahydronaphthalene-1β-carboxylic acid of Formula III is obtained.

The levorotatory lactone of 6α-bromo-8β-hydroxy-2α-methoxy - 3β,5β - epoxy - 7 - oxo - 4aα,8aα - decahydronaphthalene-1β-carboxylic acid is obtained by lectonizing the dextrorotatory 5β-hydroxy-8-oxo-1,4,4aα,5,8,8aα-hexahydronaphthalene - 1β - carboxylic acid by heating under reflux in methylene chloride with a mixture of sodium acetate and acetic acid anhydride. The resulting levorotatory lactone of 5β-hydroxy-8-oxo-1,4,4aα,5,8,8aα - hexahydronaphthalene - 1β - carboxylic acid is reduced by means of aluminum isopropylate in isopropanol to the levorotatory 1,8-lactone of 5β,8β-dihydroxy-1,4,4aα,5,8,8aα - hexahydronaphthalene - 1β - carboxylic acid. This lactone, on reacting with a calculated amount of an N-bromo imide, such as N-bromo succinimide, at about room temperature and in a bromine-resistant solvent, yields the isolated dextrorotatory lactone of 8β-hydroxy-2α-bromo-3β,5β - epoxy - 1,2,3,4,4aα,5,8,8aα - octahydronaphthalene-1β-carboxylic acid which is converted by a treatment with sodium methylate in methanol into the dextrorotatory lactone of 8β-hydroxy-2α-methoxy-3β,5β-epoxy-1,2,3,4,4aα,5,8,8aα - octahydronaphthalene - 1β-carboxylic acid which, on reaction with N-bromo succinimide in dilute sulfuric acid yields the levorotatory 1,8-lactone of 6α-bromo-7β,8β-dihydroxy-2α-methoxy-3β,5β-epoxy-4aα,8aα - decahydronaphthalene - 1β - carboxylic acid. On oxidation by means of chromic acid in acetic acid, the levorotatory lactone of 6α-bromo-8β-hydroxy-2α-methoxy - 3β,5β - epoxy - 7 - oxo - 4aα,8aα-decahydronaphthalene - 1β - carboxylic acid of Formula II is obtained which is then converted by reaction with zinc powder in acetone and acetic acid into the levorotatory 3β - hydroxy - 2α - methoxy - 7 - oxo - 1,2,3,4,4aα,7,8,8aα - octahydronaphthalene - 1β - carboxylic acid of Formula III or its zinc salt, both serving as starting material in the reaction according to the present invention. The production of all these products is described in detail in Examples 1 to 11d of U.S. Patent Number 2,952,682.

The process according to the present invention which avoids one step in the multiple-step synthesis of reserpine and related compounds considerably facilitates isolation of the reaction products. Furthermore, the use of the expensive and dangerous diazomethane which is subject to vigorous decomposition and the handling of which is quite burdensome is also avoided. An additional advantage of the present process is the fact that not only the methyl ester but also other esters of the levorotatory 3β - acetoxy - 2α - methoxy - 7 - oxo - 1,2,3,4,4aα,7,8,8aα - octahydronaphthalene - 1β - carboxylic acid of Formula I may be produced in a simple way.

The favorable results achieved by the method according to the present invention are quite surprising and could not be foreseen in view of the fact that usually hydroxy acid compounds of this type of compounds are readily lactonized in the presence of acetic acid anhydride and that ordinarily very poor results are achieved when esterifying the levorotatory 3β-acetoxy-2α-methoxy-7-oxo-1,2,3,4,4aα,7,8,8aα-octahydronaphthalene-1β - carboxylic acid of Formula Ia by using as esterifying agents alkyl esters of sulfurous acid or alcohols in the presence of an acid or even dimethyl sulfate in the presence of a strong base, for instance, sodium hydroxide or potassium hydroxide.

The following examples serve to illustrate the present invention without, however, limiting the same thereto. More particularly, the respective alkyl sulfates, solvents, or alkali metals used and the reaction temperature may be varied in accordance with the principles set forth herein and in the claims annexed hereto.

The melting points given in the examples are points of instantaneous melting determined on the Maquenne block.

The racemic mixtures of the described optically active compounds may also be used as starting materials in the process according to the present invention although there is no advantage in proceeding in such a manner.

EXAMPLE 1

*Preparation of the Levorotatory 3β-Acetoxy-2α-Methoxy-7-Oxo-1,2,3,4,4aα,7,8,8aα - Octahydronaphthalene-1β-Carboxylic Acid (Formula Ia)*

METHOD A.—ACETYLATION OF THE ACID OF FORMULA III 5 g. of the levorotatory 3β-hydroxy-2α-methoxy-7-oxo-1,2,3,4,4aα,7,8,8aα - octahydronaphthalene-1β-carboxylic acid of Formula III which is prepared according to U.S. Patent Number 2,952,682 and which has a melting point of 197° C. and a specific rotatory power of $[\alpha]_D^{20} = -170°$ (concentration: 0.5% in ethanol), are added with mechanical stirring to 10 cc. of absolutely dry pyridine while the reaction mixture is kept in a nitrogen atmosphere. 7.5 cc. of acetic acid anhydride are added. The solid compound which is at first suspended in the solvent dissolves rapidly. The solution is allowed to stand overnight while stirring and continuing introduction of nitrogen. The solution is then cooled to 0–5° C. 5 cc. of water and thereafter 15 cc. of a saturated solution of sodium chloride which has been cooled to about +5° C. are added. The resulting mixture is acidified with stirring to a pH-value of 2.0 by gradual addition of 2 N hydrochloric acid. The levorotatory 3β-acetoxy-2α-methoxy-7-oxo-1,2,3,4,4aα,7,8,8aα-octahydronaphthalene-1β-carboxylic acid (Formula Ia) precipitates soon in the form of crystals. They are filtered with suction, washed with water, and dried. Said compound is sufficiently pure for the esterification reaction according to the following Examples 2 and 3. It is slightly soluble in water, dilute aqueous acids, ether, benzene, and ethyl acetate, soluble in ethanol, methanol, and dimethyl formamide. Its melting point is 227° C.

After recrystallization from methanol for analysis, its melting point is 228–229° C. and its specific rotatory power is $[\alpha]_D^{20} = -211°$ (concentration: 0.5% in ethanol).

*Analysis.*—$C_{14}H_{18}O_6 = 282.28$. Calculated: 59.56% C; 6.43% H; 34.01% O. Found: 59.6% C; 6.5% H; 34.0% O.

Acid number: Calculated: 198.5. Found: 198.2.
Saponification number: Calculated: 397. Found: 393.7.

Its ultraviolet absorption spectrum in ethanol shows a maximum at 226 mμ with an intensity of absorption E=400.

This compound has not been described heretofore in the literature.

METHOD B.—ACETYLATION OF THE ZINC SALT OF THE ACID OF FORMULA III 1250 g. of zinc powder are added to a mixture of 9 l. of acetone and 1 l. of acetic acid which has previously been cooled to about +5° C. After cooling to about 0° C. with good mechanical stirring and while passing nitrogen through the reaction vessel, 1 kg. of the levorotatory lactone of 6α-bromo - 8β - hydroxy-2α-methoxy-3β,5β-epoxy - 7 - oxo - 4aα,8aα - decahydronaphthalene-1β-carboxylic acid (Formula II) are added. Although the reaction mixture is cooled by means of a freezing mixture of ice and salt, its temperature rises to 18–20° C. Stirring is continued until the temperature has dropped to about 3° C. Excess zinc powder is filtered off and washed with acetone. The combined filtrate and washing liquors are evaporated to dryness in a vacuum. Small amounts of acetic acid which are retained by and adhere to the solid residue, are carried away by acetone which is added once or twice to the residue and is again distilled off. The resulting zinc salt of the levorotatory 3β-hydroxy-2α-methoxy-7-oxo-1,2,3,4,4aα,7,8,8aα-octahydronaphthalene-1β-carboxylic acid is mixed with 1 l. of pyridine and dissolved by heating at 80° C. with stirring, while the reaction mixture is kept in a streaming nitrogen atmosphere. After dissolution of said zinc salt, 1 l. of acetic acid anhydride is added while keeping the temperature of the reaction mixture at about 20° C. The reaction mixture is allowed to stand at room temperature until the next morning. While cooling externally, the solution is rendered Congo acid by the addition of dilute sulfuric acid. Thereafter, the solution is cooled to 0° C. The precipitated levorotatory 3β-acetoxy-2α-methoxy-7-oxo-1,2,3,4,4aα,7,8,8aα - octahydronaphthalene-1β-carboxylic acid (Formula Ia) is filtered with suction and washed with water until the wash waters do not yield a precipitate on adding a barium chloride solution. Adhering water is removed by suction and the crystals are dried. The resulting acid is identical with that described in Example 1A.

EXAMPLE 2

*Preparation of the Levorotatory Methyl Ester of 3β-Acetoxy-2α-Methoxy-7-Oxo-1,2,3,4,4aα,7,8,8aα - Octahydronaphthalene-1β-Carboxylic Acid (Formula Ib)*

In a 20 l. reaction vessel equipped with a mechanical stirrer and a thermometer, 1 kg. of the levorotatory 3β-acetoxy-2α-methoxy-7-oxo-1,2,3,4,4aα,7,8,8aα - octahydronaphthalene-1β-carboxylic acid prepared according to Example 1a or 1b is mixed with 4 l. of acetone. A solution of 320 g. of sodium bicarbonate in 4 l. of water is added thereto in small portions with stirring. After the addition is completed, a homogeneous reaction mixture is obtained. 340 cc. of dimethyl sulfate are added all at once and stirring is continued at 20–25° C. for 3 hours. In the same manner as before, without discontinuing stirring, a solution of 80 g. of sodium bicarbonate in 1 l. of water and thereafter 80 cc. of dimethyl sulfate are added. Stirring is continued at 20–25° C. for 3 hours. The same procedure is repeated with the same amounts of reagents, but the time of additional stirring is reduced to 30 minutes. Thereafter, the reaction mixture is allowed to stand until the next morning. The solution is extracted several times by means of methylene chloride. The combined extracts are washed first with a saturated sodium bicarbonate solution and then with water. They are dried over anhydrous magnesium sulfate. After filtration and purification by means of charcoal, the solution is evaporated to dryness in a vacuum. Methylene chloride which is retained by the solid residue is removed by addition of and distillation with isopropyl ether. The remaining crystals are purified by recrystallization from isopropyl ether which dissolves the compound on boiling. After cooling, the crystals are filtered with suction and washed several times with cold isopropyl ether. A first crop of 900 g. (86% of the theoretical amount) of the levorotatory methyl ester of 3β-acetoxy-2α-methoxy-7-oxo-1,2,3,4,4aα,7,8,8aα-octahydronaphthalene - 1β-carboxylic acid (Formula Ib) are obtained. The mother liquors are concentrated to a small volume and are allowed to stand in the ice-box for crystallization. The precipitated crystals are filtered with suction and triturated with a small amount of isopropyl ether. The solvent is completely removed by suction and the crystals are dried. This second crop weighs 60 g. to 80 g. which corresponds to 6–7% of the theoretical yield, thus rendering the total yield of the process to 92–93% of the theoretical amount. The resulting compound melts at 95–96° C. and has a specific rotatory power of $[\alpha]_D^{20} = -201° \pm 2°$ (concentration: 0.5% in ethanol). It is identical with the methyl ester compound described in the U.S. Patent Number 2,952,682. It is very slightly soluble in water and dilute aqueous acids, soluble in alcohol, ether, acetone, benzene, and chloroform.

EXAMPLE 3

*Preparation of the Levorotatory Ethyl Ester of 3β-Acetoxy - 2α - Methoxy - 7 - Oxo-1,2,3,4,4aα,7,8,8aα-Octahydronaphthalene-1β-Carboxylic Acid (Formula Ib)*

The preparation of said compound is carried out in the same manner as described in Example 2. 10 g. of the levorotatory 3β-acetoxy-2α-methoxy-7-oxo-1,2,3,4,4aα,7,8,8aα-octahydronaphthalene-1β-carboxylic acid are suspended in 80 cc. of acetone. A solution of 6.4 g. of sodium bicarbonate in 80 cc. of distilled water is added thereto. After the addition of 9 cc. of diethyl sulfate, 20 cc. of acetone are admixed in order to avoid separation of the reaction mixture into two layers. The solution is allowed to stand at room temperature for 48 hours thereby stirring the mixture from time to time. The solution is extracted several times by means of methylene chloride. The combined organic extracts are washed first with distilled water, then with a saturated sodium bicarbonate solution, and finally with water. They are dried and evaporated to dryness. The residue is treated with isopropyl ether as described in Example 2. A first crop of 7.35 g. (67% of the theoretical amount) of the levorotatory ethyl ester of 3β-acetoxy-2α-methoxy-1,2,3,4,4aα,7,8,8aα-octahydronaphthalene-1β - carboxylic acid (Formula Ib) is obtained. Said compound melts at 74° C. and has a specific rotatory power of $[\alpha]_D^{20} = -185°$ (concentration: 0.5% in ethanol). It is insoluble in water, slightly soluble in isopropyl ether, quite soluble in ether, soluble in methanol, ethanol, ethyl acetate, benzene, and methylene chloride, very soluble in chloroform.

*Analysis.* — $C_{16}H_{22}O_6 = 310.34$. Calculated: 61.92% C; 7.15% H; 30.93% O. Found: 61.8% C; 7.2% H; 31.1% O.

The ultraviolet absorption spectrum in ethanol shows a maximum at 226mμ and an excitation coefficient ε = 11,600.

This compound has not yet been described in the literature.

Conversion of the lower alkyl esters of the levorotatory 3β-acetoxy-2α-methoxy-7-oxo-1,2,3,4,4aα,7,8,8aα-octahydronaphthalene-1β-carboxylic acid of Formula Ib obtained according to the present invention into reserpine proceeds in the same manner as described in U.S. Patent Number 2,952,682 by converting said esters into the levorotatory 1β-carboxy methyl-2β-alkoxy carbonyl-3α-methoxy-4β-acetoxy-6β-formyl cyclohexane by ozonizing the compound of Formula Ib in acetic acid ethyl ester or methylene chloride at temperatures between 0° C. and −60° C., reacting the resulting ozonide with zinc powder in the presence of acetic acid followed by oxidation by means of chromic acid or periodic acid or directly by the action of water or of iodic acid or periodic acid on said ozonide. The methyl ester of the carboxy methyl cyclohexane compound, obtained by reaction with diazomethane in a mixture of methylene chloride and ether is then condensed with 6-methoxy tryptamine. The condensation product yields, after a treatment with sodium borohydride and thereafter with alcoholic sodium hydroxide solution, the dextrorotatory 18β-hydroxy-11,17α-dimethoxy-3-oxo-16β carboxy-2,3-seco-20α-yohimbane. This compound is lactonized to the corresponding lactone by heating with acetic acid anhydride, acetic acid, and lithium acetate. Reaction of said lactone with phosphorus oxychloride, while heating, yields the lactone of 18β-hydroxy-11,17α-dimethoxy-16β-carboxy-3,4-dehydro-20α-yohimbane. Reduction of said lactone by means of zinc powder in the presence of acetic acid yields the lactone of reserpic acid or by means of an alkali metal borohydride the lactone of isoreserpic acid which is isomerized to the lactone of reserpic acid by a treatment with pivalic acid. Conversion of reserpic acid lactone into the methyl ester of reserpic acid and acylation of said ester by reaction with 3,4,5-trimethoxy benzoylchloride finally yields reserpine. The procedure employed in this new reserpine synthesis is described in detail in U.S. Patent Number 2,952,682 and especially in Examples 11g to k, 12, and 13 of said patent.

We claim:

The process of preparing the levorotatory in ethanol lower alkyl esters of 3β-acetoxy-2α-methoxy-7-oxo-1,2,3,4,4aα,7,8,8aα-octahydronaphthalene-1β-carboxylic acid, wherein said lower alkyl is a member selected from the group consisting of methyl and ethyl which comprises the steps of (a) subjecting a member selected from the group consisting of the levorotatory in ethanol 3β-hydroxy-2α-methoxy-7-oxo-1,2,3,4,4aα,7,8,8aα-octahydronaphthalene-1β-carboxylic acid and its zinc salt to the action of acetic acid anhydride in the presence to a tertiary base selected from the group consisting of pyridine, methyl ethyl pyridine and triethylamine and precipitating the levorotatory in ethanol 3β-acetoxy-2α-methoxy-7-oxo-1,2,3,4,4aα,7,8,8aα-octahydronaphthalene-1β-carboxylic acid by acidifying the reaction mixture;

(b) converting said carboxylic acid into its alkali metal salts;

(c) subjecting said alkali metal salt in a homogeneous medium in a mixture of water and a neutral hydroxyl group-free organic solvent to the action of a di-(lower alkyl) sulfate selected from the group consisting of dimethyl sulfate and diethyl sulfate and (d) recovering said levorotatory in ethanol lower alkyl ester of 3β-acetoxy-2α-methoxy-7-oxo-1,2,3,4,4aα,7,8,8aα-octahydronaphthalene-1β-carboxylic acid.

References Cited in the file of this patent

UNITED STATES PATENTS 2,883,384 Woodward _____ Apr. 21, 1959

OTHER REFERENCES

Woodward et al.: J. Am. Chem. Soc., 78, 2023–5 (1956).

Migrdichian: "Organic Synthesis," vol. I, p. 327, Reinhold, 1957.